United States Patent

[11] 3,604,853

[72] Inventor Ernst Pless
       Vienna, Austria
[21] Appl. No. 684,354
[22] Filed Nov. 20, 1967
[45] Patented Sept. 14, 1971
[73] Assignee Akustische V. Kino-Geraete Gesellschaft m.b.H.
       Vienna, Austria
[32] Priority Nov. 29, 1966
[33]          Austria
[31]          A11034/66

[54] ADJUSTMENT-FACILITATING DEVICE FOR USE WITH A MICROPHONE AND VOLUME CONTROLLER
    5 Claims, 14 Drawing Figs.
[52] U.S. Cl. .................................................. 179/1 A,
                        179/2 R, 235/87 R, 179/179
[51] Int. Cl. .................................................. G06c 3/00
[50] Field of Search .................................... 179/1, 1 A,
           179, 153, 147, 1 V, 121, 158, 2; 235/61 B, 79.5,
                                               87; 116/136.5

[56]              References Cited
              UNITED STATES PATENTS
    924,406  6/1909  Walker ......................... 235/61 B

| 1,444,381 | 2/1923  | Landenberger | 235/61 B |
| 1,560,599 | 11/1925 | Moler        | 235/61 B |
| 2,118,773 | 5/1938  | Ball         | 235/83   |
| 3,117,722 | 1/1964  | Bugelholl    | 235/64.7 |
| 2,788,765 | 4/1957  | Haynes       | 116/129  |
| 2,948,259 | 8/1960  | Frost et al. | 116/136.5|

FOREIGN PATENTS

| 1,206,020 | 12/1965 | Germany | 179/1 V |

Primary Examiner—William C. Cooper
Attorney—Toren and McGeady

ABSTRACT: A device for facilitating correlation between the values, sound source distance, sound source volume and gain control setting, of an electroacoustical system including a microphone and an amplifier having a gain control, when two of these values are known, comprises a scale support carrying, in mutually fixed coordination, a first scale representative of the setting of the gain control, and at least one other scale representative of the distance of the sound source from the microphone. A slide on the support is movable along the scales and has a first indicator cooperable with the first scale and second indicator elements cooperable simultaneously with at least three adjacent indicia of each other scale. The device may comprise a unit physically independent of the microphone and the gain control, incorporated with the microphone, or incorporated with the gain control.

INVENTOR.
ERNST PLESS

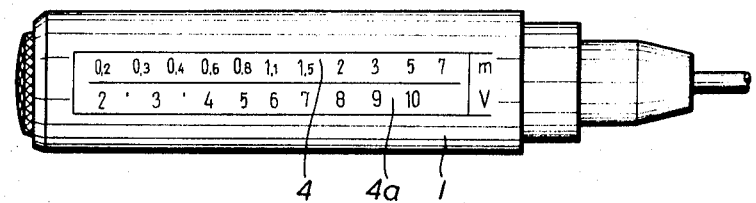
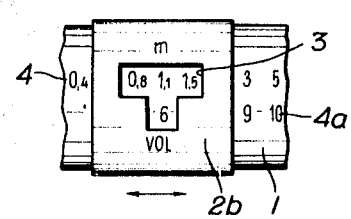
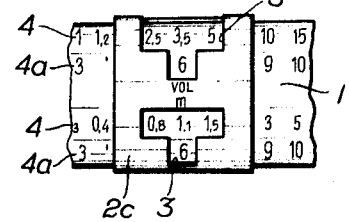
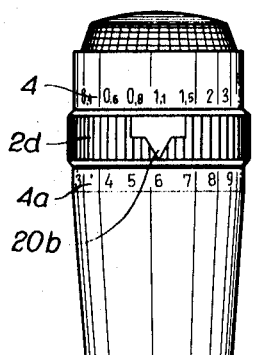
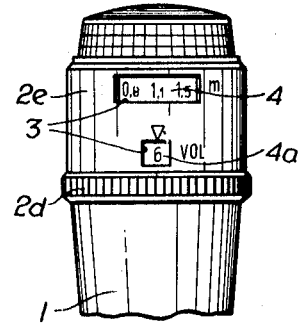
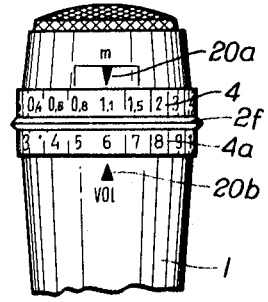
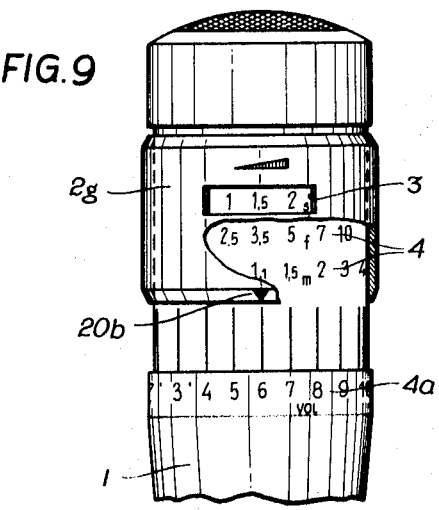
INVENTOR.
ERNST PLESS

INVENTOR.
ERNST PLESS

ADJUSTMENT-FACILITATING DEVICE FOR USE WITH A MICROPHONE AND VOLUME CONTROLLER

BACKGROUND OF THE INVENTION

As a result of the increasing widespread use of electroacoustic installations in everyday life, technically unskilled persons are increasingly confronted with such installations. Consequently, it is desirable to simplify the operation of such installations as far as possible, so improper operation or failures, due to wrong adjustments and the like, may be precluded.

During on-the-spot reports recorded by a single operator or reporter, it is difficult to continuously control the amplifier of a tape recorder or the like so that excessive volume fluctuations, during the recording, will be avoided. Particularly when sound is to be received from sound sources at different distances, for example, during conversation with several persons, it is nearly impossible to conduct the interview and at the same time to watch the level meter of a tape recorder. Nevertheless, to obtain a usable recording, the reporter must exercise care that the distance from the microphone to the speaker remains the same as far as possible. Even if this care is taken, it is still nearly impossible to take into account or consideration variations in speech volume.

SUMMARY OF THE INVENTION

This invention relates to sound recording and, more particularly, to a novel adjustment facilitating device for use in correlating the setting of a gain control and the sound input level at a microphone operatively associated with the gain control.

The device of the invention is intended for use in the electroacoustic transmission of sound events, so that problems of level control during transmission of sound events at different distances from a microphone are substantially simplified. For this purpose, the invention arrangement enables the provision of satisfactory on-the-spot reports and the like by a single operator and without the need of expensive automatically controlled amplifiers.

To this end, the invention device indicates, for a given position or setting of the gain control or volume controller, the proper distances between sound sources and the microphone in the case of loud, medium and low sound sources, and indicates, for a given distance between a sound source and the microphone, the required setting of the gain control, this being effected without necessity for a recording level indicator.

To explain the invention, it may be assumed that the amplification is defined by a given factor which is constant. In this case, the adjustment-facilitating device of the invention can comprise a simple range scale, which may be straight or circular, and which is provided at suitable points with marks having the inscriptions "low," "medium" and "loud." The simple adjustment-facilitating means will indicate the distance necessary to be maintained between the microphone and a sound source having a given intensity.

The device of the invention may also take into account the amplification factor, which is determined by the setting of a gain control. In this case, the invention is based on the fact that there is a direct relation between the amplification and the distance between the sound source and the microphone. Thus the nearer the sound source is to the microphone, the lesser may be the required amplification. To take the foregoing into consideration, the invention device is characterized in that a visual functional relation is established between a scale and the like, provided with distance or sound intensity indications, and the settings or positions of a movable controller or indicator which controls or indicates the gain of the sound recording installation.

In a first and simple embodiment of the invention, the adjustment-facilitating device comprises two scales, a first scale provided with figures or symbols relating to the settings of the gain control and a second scale juxtaposed to the first scale and provided with distance indications so that the required distance from the sound source to the microphone can be read for any given setting of the volume controller, and the correct setting of the controller for any given distance from the sound source to the microphone is directly apparent. In this embodiment of the invention, the intensity of sound at the source is not taken into consideration.

In another embodiment of the invention, the intensity of the sound source is taken into consideration by providing a movable slider between the two scales and having one indicating mark on the side adjacent to the volume control scale and at least three marks on its side adjacent to the distance scale. These latter three marks correspond to three sound intensity values or levels at the sound source.

In order that the device of the invention may be used with different tape recorders and different microphones, the scales, while normally fixed, can be relatively displaced by a certain amount for adaptation to different applicances. Additional marks, or separate scales, may be provided to indicate the distances between the sound source and the microphone when used outdoors or indoors, because different gain values are required in each instance.

In practice, the microphone may be used to pick up sound from a medium intensity source at a certain distance before the actual recording, and the amplification of the sound recorder may be adjusted so that the level meter indicates a normal level. The two scales of the simplest embodiment of the invention are then moved relatively until the scale value corresponding to the setting of the volume controller is in registry with that point of the distance scale corresponding to the distance from the microphone to the sound source used in the test.

When the distance from the sound source to the microphone is suddenly changed, a brief examination of the adjustment-facilitating device of the invention will suffice to determine immediately the now required setting of the gain control of the sound recorder. This position can be set before sound is received over the new distance. When the relative positions of the two scales have been established for a given combination of sound recorder and microphone, the correct setting of the appliances can be obtained at any time without a transmitting test, and the scales may be fixed relative to each other.

In the embodiment of the invention including a slider, as mentioned above, the mode of operation is basically the same. The provision of the slider enables a determination of the range in which useful recordings are obtained, without need for a change in the setting of the gain control, and a compensation of volume fluctuations by a change of the distance from the sound source to the microphone in accordance with the indications given by the adjustment-facilitating device. The device may be embodied in various forms. For example, linear scales are not essential and the scales may be circular, such as common with circular slide rules. Any sliders which are used may be designed in accordance with the two configurations and in a known manner. The device may be made as a separate article which can preferably be carried conveniently in the pocket, or the device may consist of a pendant or the like.

Alternatively, the device may be mounted directly on the microphone or its housing, and this concept may be embodied in various ways. In one embodiment, the microphone housing may comprise a solid of revolution which is embraced by the two scales which are conjointly rotatable and which can preferably be adjusted relative to each other with a certain frictional restraint. The corresponding marks are provided on the microphone housing. This particular embodiment of the invention is very advantageous because the device cannot be lost and can easily be inspected when required.

It is desirable to indicate the distance between the microphone and the source of sound not only in meters but also in feet and even in paces, because a measuring tape is not always available and pacing will provide sufficiently accurate results. In an embodiment of the invention, three annular distance scales are arranged in juxtaposed position on the microphone body and respectively indicate distances in meters, distances in feet, and distances in paces.

The three scales are covered by a sleeve surrounding the microphone housing, and which is rotatably and slidably mounted thereon, this sleeve being formed with a window or aperture permitting viewing of only one scale at a time. During use, the sleeve is displaced longitudinally of the microphone body, or parallel to the axis of the solid of revolution, until the selected one of the three scales becomes visible in the window, detent devices being provided to prevent an unintended displacement of the sleeve during use. The scale representing the settings of the gain control is disposed outside the sleeve and cooperates with a mark provided on the sleeve. When the distance scale having the desired units has been selected by a longitudinal displacement of the sleeve, the device is used in the same way as described above. If the microphone is noncircular in cross section, the ring or sleeve may be elastic to closely embrace the microphone housing in the nature of an elastic belt or the like.

In accordance with the invention, the adjustment-facilitating means or device may be provided on the amplifier or tape recorder. In the simplest case, a rotary knob is used and is provided with a distance scale in registry with suitable indicating marks provided on the housing of the amplifier or the tape recorder.

In further accordance with the invention, the adjustment-facilitating device may alternatively be combined with a control slider, in which case the scales can be provided on both sides of the path of the slider. The knob of the slider can either be provided with suitable indicating marks or can be designed as a pointer.

In yet another embodiment of the invention, the housing of the microphone is provided with a series of small lamps preferably in different colors, and these lamps correspond to significant points of a distance scale and indicate the setting of the gain control and the related distance from the sound source to the microphone.

In still another embodiment of the invention, the volume controller may be incorporated directly in the microphone housing and this embodiment includes the same features as the embodiment in which the adjustment-facilitating device or means is directly combined with the gain control or volume setting member in an amplifier housing.

An object of the present invention is to provide an adjustment-facilitating device for use with a microphone and a gain control.

Another object of the invention is to provide such a device enabling satisfactory on-the-spot reports and the like by a single operator of sound recording equipment and without the need of expensive automatically controlled amplifiers.

A further object of the invention is to provide such a device which indicates, for a given setting of the gain control, the correlated distance from the sound source to the microphone in the case of loud sound sources, medium sound sources, and low sound sources.

Yet another object of the invention is to provide such a device which indicates, for a given distance from the sound source to the microphone, the correlated setting of the gain control and without need for a level indicator.

A further object of the invention is to provide such a device comprising a simple range or distance scale provided at suitable points with marks indicating low sound level, medium sound level, and high sound level.

Still another object of the invention is to provide such a device which takes into consideration the amplification factor of the amplifier of the sound recorder.

A further object of the invention is to provide such a device in which a visual functional relation is established between a scale provided with distance or sound intensity indications and the position or setting of a movable recording volume controller or indicator which controls or indicates the gain of a recording device or the like.

Another object of the invention is to provide such a device which may be incorporated with a microphone or which may be incorporated with an amplifier or sound recorder.

A further object of the invention is to provide such a device including a scale indicating gain control setting and at least one scale indicating the distance between a microphone and a sound source, together with a slider establishing correlation between the two scales.

Another object of the invention is to provide such an adjustment-facilitating device which can be made as a separate article for convenient transport.

BRIEF DESCRIPTION OF THE DRAWINGS

For an understanding of the principles of the invention, reference is made to the following description of typical embodiments thereof as illustrated in the accompanying drawings.

In the drawings:

FIG. 3 illustrates a device embodying the invention as combined with a microphone;

FIG. 4 is a partial side elevation view illustrating the device of FIG. 3 as provided with a slider;

FIG. 5 is a view similar to FIG. 4, but in which the device comprises a plurality of distance scales using respective different measuring units;

FIG. 6 is an elevation view of a microphone provided with another embodiment of the device according to the invention;

FIGS. 7, 8 and 9 are partial elevation views illustrating modifications of the arrangements shown in FIG. 6;

DESCRIPTION OF THE PREFERRED EMBODIMENTS

Figure 1:
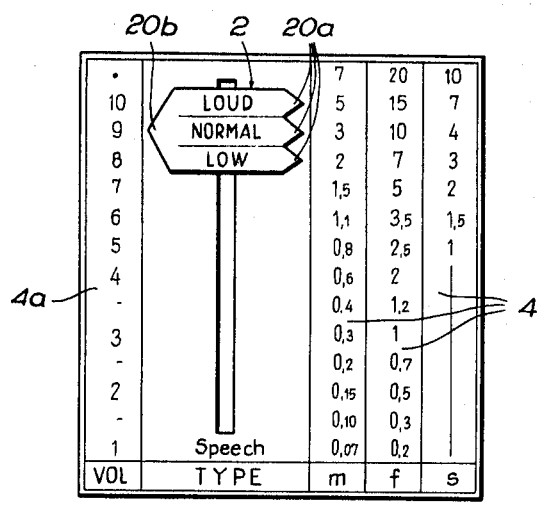
FIGS. 1 and 2 are elevation views of a device embodying the invention and designed as a separate article.

Referring to FIG. 1, the embodiment of the adjustment-facilitating device shown therein is in the form of a tablet bearing three scales 4 and a single scale 4a. Scale 4a, bearing the legend "VOL," is provided with the numbers 1 to 10 corresponding to 10 positions or settings of the gain control. The scales 4, shown to the right in FIG. 1, represent the distance from the sound source of the microphone in meters (m), feet (f), and paces or steps (s), respectively, as indicated by the data of the lower end of each scale 4a. A slider 2 is mounted for longitudinal slidable movement between gain control setting scale 4a and the left hand distance scale 4. Slider 2 carries, in three fields the respective inscriptions, "LOUD," "NORMAL," and "LOW." Each field has a respective arrow 20a directed toward distance scales 4, and the slider has a single arrow 20b directed toward the gain control setting scale 4a.

In the position of the parts shown in FIG. 1, slider 2 indicates that, with the gain control set at position 9, the distance from a medium-intensity sound source to the microphone should be 3 meters for a normal recording level on the tape of a tape recorder. A loud speaker would require a distance of 5 meters from the microphone, and a low speaker a distance of 2 meters. The indicated values do not represent actual values, but are only for illustrative purposes.

At the lower end of the device as shown in FIG. 1, the word "SPEECH" appears over the word "TYPE." This means that the adjustment-facilitating device in FIG. 1 indicates the correlated values for speech. For other sound events, such as solo performances, musical recordings, etc., the relations differ from those or speech recordings. In such casing, a different adjustment-facilitating device is required, which is suitable for the particular type of sound to be picked up. However, the slider may be so designed as to provide an adjustment-facilitating device of universal utility.

Figure 2:
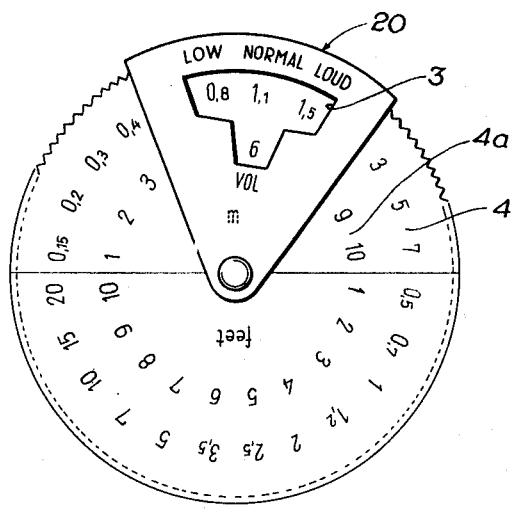

FIG. 2 illustrates the device of the invention as embodied in the form of circular disc carrying circular scales 4 and 4a rather than rectilinear scales. Slider 20 comprises a sector of a circle, and is rotatable about the center of the scales and formed with an aperture 3 constituting a window through which the scales can be read. The upper scale 4 represents distance in meters, and the lower scale 4, which is the radially outer scale, represents distances in feet. The adjustment-facilitating device shown in FIG. 2 has basically the same function as that shown in FIG. 1, from which latter it differs only in form.

A particularly simple embodiment of the invention is shown in FIG. 3 in which two parallel scales 4 and 4a are arranged in juxtaposed position on a rod-shaped microphone 1. Scale 4 again represents distances between a sound source and the microphone, and scale 4a again represents the settings of the gain control, as indicated by the representative marks "m" and "V." The juxtaposed scales indicate immediately the correlated distance from the sound source to the microphone for a given setting of the gain control, and vice versa.

A further development of the embodiment of the invention shown in FIG. 3 is illustrated in FIG. 4. Referring to FIG. 4, the slider 2b is in the form of a sleeve provided with a window and slidably fitted on the rod-shaped microphone housing 1, which latter may be cylindrical or prismatic in cross section. Only a single value can be read from volume control setting scale 4a, but the longer portion of the window aligned with scale 4 enables the operator to read a range of values of this distance scale. In the particular case illustrated in FIG. 4, the distance range from 0.8 m. to 1.5 m. is visible. The arrangement is preferably such that, with a given setting of the gain control as is read through the smaller portion of the window 3, that range of the distance scale in which a satisfactory recording will be obtained will be visible in the longer portion of the window 3. Alternatively, window 3 may be designed to provide a reading within limits corresponding to optimum distances between loud or low speakers and the microphone, or for outdoor or indoor use.

FIG. 5 illustrates a further development of the embodiment of the invention shown in FIGS. 3 and 4, in which a scale of distances in feet is provided in addition to the scale of distances in meters. For example, the upper scale 4 represents distances in feet and the lower scale 4 represents distances in meters. The slider 2c has two windows 3, one having a longer opening coinciding with the scale having distances in feet and the other having a longer portion coinciding with the scale having distances in meters, and a respective gain control setting scale 4a is operatively associated with each scale 4.

Embodiments of the invention in which the adjustment-facilitating device is provided on the body or housing of a microphone are shown in FIGS. 6, 7, 8 and 9. Referring first to FIG. 6, distance scale 4 and gain control setting scale 4a are carried directly by the microphone 1, on the surface thereof, and the reference marks associated with the scales, such as the reference mark 20b, are carried on a rotatable ring 2d disposed between scales 4 and 4a and having the same function as the slider shown in FIGS. 1 and 2.

A different but equivalent embodiment of the device is shown in FIG. 7. The embodiment of the invention shown in FIG. 7 differs from that shown in FIG. 6 in that the scales 4 and 4a are covered by an extension or sleeve 2e of rotatable ring 2d, so that the scales can be read only through windows 3 in the sleevelike extension.

It is expensive to provide scales directly on the surface of the microphone housing, and this expense may be reduced or eliminated by the arrangement of FIG. 8. Referring to FIG. 8, scales 4 and 4a are provided on a rotatable ring 2f, and fixed indicating reference marks 20a and 20b are provided on the microphone housing. The arrangement of FIG. 8 has the advantage that it is relatively simple to make a rotatable ring 2f, comprising two parts which are relatively adjustable, so that the adjustment-facilitating device can easily be calibrated in the manner described above.

A particularly refined embodiment is shown in FIG. 9 as including three distance scales 4, respectively calibrated in meters, feet, and paces or steps. The scales are juxtaposed with each other on a cylindrical portion of the microphone housing 1. A sleeve 2g is provided and is displaceable longitudinally and rotatably relative to the cylindrical portion of housing 1. Sleeve 2g has only a single window 3 through which only one scale 4 can be read at a time. A detent device (not shown) enables an exact setting of the sleeve into alignment with a selected scale, and also prevents an unintended displacement to a different scale 4. The gain control setting scale 4a is provided on microphone body 1 outside of sleeve 2, and cooperates with an indicating reference mark 20b on sleeve 2. When reading window 3 of sleeve 2g has been aligned with desired distance scale 4, the adjustment-facilitating device is operated in the same manner as described for the preceding embodiments of the invention.

Figure 10:
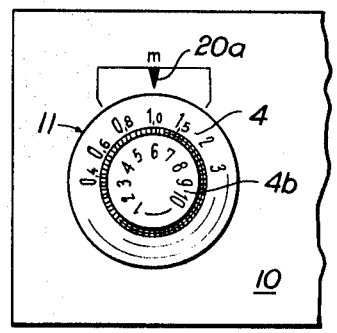
FIGS. 10 and 11 are partial elevation or plan views illustrating the device embodying the invention as incorporated in an amplifier or tape recorder.
Figure 11:
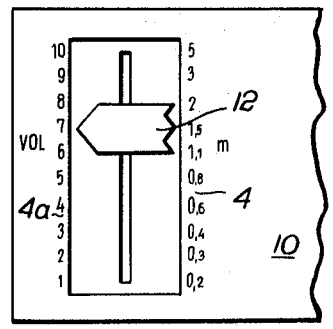

As shown in FIGS. 10 and 11, the adjustment-facilitating device of the invention may be structurally combined with the gain control of the sound installation, and such a gain control may be incorporated, for example, in the amplifier housing or in a tape recorder. Referring to FIG. 10, the knob 11 for adjusting a gain control 10 is provided with a distance scale 4 and may be provided if desired, with a volume setting scale 4b. In the same manner as previously described, scales 4 and 4b cooperate with indicating mark 20a on the housing containing the gain control and which may be an amplifier housing or a tape recorder housing.

As shown in FIG. 11, a control slider may be combined with the adjustment-facilitating device. In this case, scales 4 and 4a are provided on opposite sides of the path of movement of slider knob 12, and slider knob 12 is constructed in essentially the same manner as the slider 2 of FIG. 1, having three indicators cooperating with the distance scale 4 and a single indicator cooperating with the volume setting scale 4a. Alternatively, slider knob 12 may be provided with suitable projections, recesses, or the like for indicating the values to be read from the two scales. Slider knob 12 is secured to the gain control of the amplifier or sound recorder.

Figure 12:
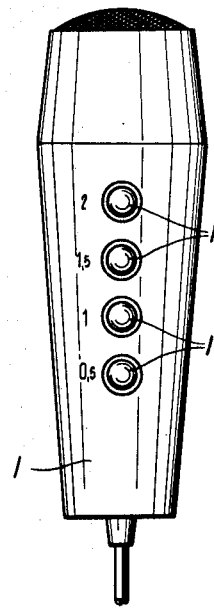
FIG. 12 is an elevation view of a device embodying the invention, as incorporated in a microphone, and including a series of lamps of respective different colors.
Figure 12A:
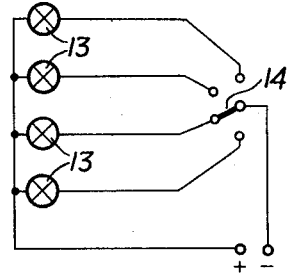
FIG. 12a is a schematic wiring diagram related to the arrangement shown in FIG. 12.

FIGS. 12 and 12a illustrate an embodiment of the invention in which the adjustment-facilitating device is incorporated with the body or housing 1 of a microphone. Referring to these figures, lamps 13, preferably of respective different colors, are mounted in the body or housing 1 of the microphone and each lamp is associated with a different respective distance from the sound source to the microphone, as indicated by the respective numerals alongside each lamp 13. A multiple-position switch 14, shown in FIG. 12a, is mounted on the same shaft as the volume controller of the sound installation, so that each lamp is associated with a certain angular position or setting of the gain control. The embodiment of the invention shown in FIGS. 12 and 12a provides a particularly convenient and fast reading, and the accuracy which is obtained is quite sufficient for acoustic purposes. The distance values may be indicated on a cover glass for each lamp, so that the device becomes particularly suitable for recording on-the-spot reports outdoors and during night hours.

Figure 13:
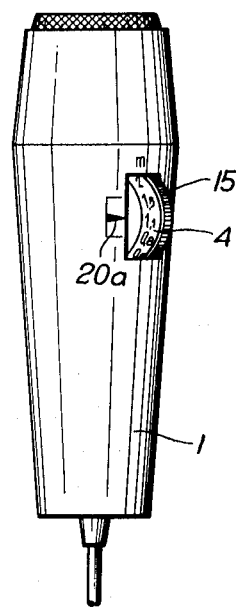
FIG. 13 is an elevation view of a modified form of the invention in which a volume control member is incorporated in a microphone housing.

FIG. 13 illustrates a microphone 1 which contains, in its housing, a volume or gain control setting member 15 for a remote gain control. As in the embodiment shown in FIG. 6, the knob of the setting member is provided with a distance scale 4, and a reference or indicating mark 20a is provided on housing 1 adjacent the knob. The scales may be covered with luminous paint, so that the reporter can work also during night hours.

The adjustment-facilitating device of the invention is also suitable for appliances and installations provided with automatic volume control, because there are limits to such an automatic control. In analogy to photographic cameras having an automatic exposure control system, zones and different colors may be used to indicate in what ranges a satisfactory recording level will be obtained or will not be obtained on the sound recording medium.

The invention device provides a fast and a reliable device particularly when working with portable sound recorders. Numerous designs may be employed, and it is not possible to outline specifically all of the embodiments which may be conceived. The device may be very large or very small, for example, in the form of a key pendant. It may be structurally simple or complicated, and may cooperate, for example, with an instrument having a pointer and distance scale. A deflection of the instrument will indicate the position or setting of the gain control, and the pointer will then indicate the optimum distance from the sound source to the microphone.

The instrument may be replaced by a different indicator such as a small electron-beam tube carried directly by the microphone. The gain control may also be disposed in the microphone housing. In this case, the entire arrangement would replace the usual level meter. It is sufficient, in use, to adjust the controller until the pointer assumes the position corresponding to the actual distance from the sound source to the microphone. When this is the case, the optimum recording level will be obtained. This operation may be repeated when the distance from the sound source to the microphone is changed. Compared to the usual indication of the recording level on the microphone, the arrangement of the invention has the advantage that it enables a preadjustment of the installation so that a sound transmission test is not required. The adjustment is also faster and more reliable than with the aid of a level meter because the values indicated by the adjustment-facilitating device have proved satisfactory in practice.

While specific embodiments of the invention have been shown and described in detail to illustrate the application of the principles of the invention, it will be understood that the invention may be embodied otherwise without departing from such principles.

What is claimed is:

1. In an electroacoustical system including a microphone and an amplifier having a gain control, a device for the numerical determination of one of the values sound source distance, sound source volume and gain control setting, when two of these values are known, said device comprising, in combination, a microphone housing element having a circular cross section; and a cylindrical element rotatably mounted on said circular cross section housing element; one of said elements carrying two scales each respective to one of said values, and the other of said elements carrying indicating means cooperable with said scales to coordinate said scales with respect to said third value.

2. A device, as set forth in claim 1, characterized in that said housing element constitutes a scale support; said cylindrical element comprising a ring rotatably mounted on said microphone housing element and having an aperture exposing said scales.

3. A device, as set forth in claim 2, characterized in that there are a plurality of a first type of scales each in mutually fixed relationship with one of a plurality of a second type scales; said ring having a plurality of apertures each exposing a respective one of said first type of scales and the associated one of said respective second type of scales; and each of said second type of scales being calibrated in different respective measuring units.

4. A device, as set forth in claim 2, characterized in that said ring includes a sleeve mounted on said microphone housing element for displacement longitudinally of said microphone housing element; there being a plurality of a second type of scales, each calibrated in different respective measuring units, said second type of scales being displaced longitudinally of said microphone housing element; and said sleeve being formed with a window exposing only one of said second type of scales at a time.

5. A device, as claimed in claim 2, in which said gain control is incorporated in said microphone.